United States Patent
Gao et al.

(10) Patent No.: US 12,287,422 B2
(45) Date of Patent: Apr. 29, 2025

(54) SIGNAL SENDING METHOD AND RELATED APPARATUS

(71) Applicant: HUAWEI TECHNOLOGIES CO., LTD., Guangdong (CN)

(72) Inventors: Lei Gao, Beijing (CN); Sha Ma, Beijing (CN); Sida Song, Beijing (CN)

(73) Assignee: Shenzhen Yinwang Intelligent Technologies Co., Ltd., Shenzhen (CN)

( * ) Notice: Subject to any disclaimer, the term of this patent is extended or adjusted under 35 U.S.C. 154(b) by 319 days.

(21) Appl. No.: 17/896,683

(22) Filed: Aug. 26, 2022

(65) Prior Publication Data

US 2022/0413086 A1 Dec. 29, 2022

Related U.S. Application Data

(63) Continuation of application No. PCT/CN2021/078336, filed on Feb. 27, 2021.

(30) Foreign Application Priority Data

Feb. 29, 2020 (CN) .......................... 202010134540.4

(51) Int. Cl.
*G01S 7/00* (2006.01)
*G01S 7/02* (2006.01)
*G01S 13/931* (2020.01)

(52) U.S. Cl.
CPC .............. *G01S 7/003* (2013.01); *G01S 7/023* (2013.01); *G01S 13/931* (2013.01)

(58) Field of Classification Search
CPC ........ G01S 7/003; G01S 7/282; G01S 13/931; G01S 7/0235; G01S 7/232; G01S 7/023
See application file for complete search history.

(56) References Cited

U.S. PATENT DOCUMENTS

| | | | |
|---|---|---|---|
| 8,848,827 B2* | 9/2014 | Hiscock | H04B 17/382 455/39 |
| 9,239,378 B2* | 1/2016 | Kishigami | G01S 7/0233 |
| 9,664,777 B2* | 5/2017 | Kishigami | G01S 7/023 |
| 9,897,685 B2* | 2/2018 | Ossowska | G01S 7/023 |
| 10,082,562 B1* | 9/2018 | Abari | G01S 13/48 |
| 10,234,540 B2* | 3/2019 | Kim | G01S 13/343 |
| 10,365,349 B2* | 7/2019 | Kishigami | G01S 7/023 |
| 10,514,442 B2* | 12/2019 | Lim | G01S 13/284 |
| 10,623,075 B2* | 4/2020 | Pratt | H04B 7/0617 |

(Continued)

FOREIGN PATENT DOCUMENTS

| | | |
|---|---|---|
| CN | 102662161 A | 9/2012 |
| CN | 108631984 A | 10/2018 |

(Continued)

OTHER PUBLICATIONS

Extended European Search Report in European Appln No. 21761182. 1, dated Jul. 6, 2023, 13 pages.

(Continued)

*Primary Examiner* — Peter M Bythrow

(74) *Attorney, Agent, or Firm* — Fish & Richardson P.C.

(57) ABSTRACT

A signal sending method and a detection apparatus are provided. One method includes: sending, by a detection apparatus, a first signal for target detection, and sending, by the detection apparatus, a second signal indicating information about a resource occupied by the first signal.

21 Claims, 6 Drawing Sheets

(56) References Cited

U.S. PATENT DOCUMENTS

| | | | | |
|---|---|---|---|---|
| 10,855,328 | B1* | 12/2020 | Gulati | G01S 7/0234 |
| 10,955,547 | B2* | 3/2021 | Ray | G01S 7/003 |
| 11,109,388 | B2* | 8/2021 | Wu | H04W 74/0808 |
| 11,385,323 | B2* | 7/2022 | Gulati | H04J 13/0062 |
| 11,460,539 | B2* | 10/2022 | Engewald | G01S 7/023 |
| 11,513,187 | B2* | 11/2022 | Stettiner | G01S 7/2883 |
| 11,520,003 | B2* | 12/2022 | Stettiner | H04B 1/715 |
| 11,585,919 | B2* | 2/2023 | Gulati | G01S 13/343 |
| 11,644,529 | B2* | 5/2023 | Gulati | G01S 13/343 342/173 |
| 11,656,322 | B2* | 5/2023 | Aydogdu | G01S 13/343 342/60 |
| 2018/0019797 | A1* | 1/2018 | Khan | H04B 7/0689 |
| 2020/0025866 | A1* | 1/2020 | Gulati | G01S 13/931 |
| 2020/0028656 | A1* | 1/2020 | Gulati | G01S 13/343 |

FOREIGN PATENT DOCUMENTS

| | | | | |
|---|---|---|---|---|
| CN | 109076555 | A | 12/2018 | |
| CN | 109151833 | A | 1/2019 | |
| CN | 109407088 | A | 3/2019 | |
| CN | 112203350 | A | 1/2021 | |
| DE | 102017216435 | A1 * | 3/2019 | G01S 13/931 |
| DE | 102018121851 | B3 | 2/2020 | |
| EP | 1326088 | A2 | 7/2003 | |
| WO | 2019205724 | A1 | 10/2019 | |

OTHER PUBLICATIONS

PCT International Search Report and Written Opinion issued in International Application No. PCT/CN2021/078336 on Jun. 2, 2021, 16 pages (with English translation).

* cited by examiner

SIGNAL SENDING METHOD AND RELATED APPARATUS

CROSS-REFERENCE TO RELATED APPLICATIONS

This application is a continuation of International Application No. PCT/CN2021/078336, filed on Feb. 27, 2021, which claims priority to Chinese Patent Application No. 202010134540.4, filed on Feb. 29, 2020. The disclosures of the aforementioned applications are hereby incorporated by reference in their entireties.

TECHNICAL FIELD

This application relates to the sensor field, and in particular, to a signal sending method and a related apparatus.

BACKGROUND

With the development of society, increasingly more machines in the modern life develop towards automation and intelligentization, and a vehicle used for mobile traveling is no exception. An intelligent vehicle is entering daily lives of people. In recent years, an advanced driving assistant system (Advanced Driving Assistant System, ADAS) plays an important role in the intelligent vehicle. The ADAS system uses various sensors installed on the vehicle to sense an ambient environment, collect data, and identify, detect, and trace a still object and a moving object in a driving process of the vehicle, and performs a system operation and system analysis with reference to map data of a navigator, so that a driver can be aware of a possible hazard in advance, to effectively increase driving comfort and safety of the vehicle.

In an unmanned driving architecture, a sensor layer includes a vision sensor such as a vehicle-mounted camera and a radar sensor such as a vehicle-mounted millimeter-wave radar, a vehicle-mounted laser radar, and a vehicle-mounted ultrasonic radar. The millimeter-wave radar becomes a main sensor of an unmanned driving system because of low costs and a mature technology. Currently, more than 10 functions have been developed for the ADAS, including adaptive cruise control (Adaptive Cruise Control, ACC), autonomous emergency braking (Autonomous Emergency Braking, AEB), lane change assist (Lance Change Assist, LCA), and blind spot monitoring (Blind Spot Monitoring, BSD). All these functions rely on the vehicle-mounted millimeter-wave radar. A millimeter wave is an electromagnetic wave with a wavelength of 1 mm to 10 mm, and a corresponding frequency range is 30 GHz to 300 GHz. In this frequency band, millimeter wave-related features are very suitable for use in the vehicle-mounted field. For example, a high bandwidth means abundant frequency domain resources and a low antenna side lobe, thereby facilitating imaging or quasi-imaging. A short wavelength means a reduced size of a radar device and a reduced antenna diameter, and therefore a weight is reduced. A narrow beam means that in a case of a same antenna size, a millimeter-wave beam is much narrower than a micrometer-wave beam, and therefore radar resolution is high. Strong penetration means that compared with laser radar and an optical system, the millimeter-wave radar has a better capability of penetrating smoke, dust, and fog, and can work around the clock.

With widespread use of vehicle-mounted radars, mutual interference between vehicles in which the vehicle-mounted radars are located becomes increasingly severe. Mutual interference reduces a detection probability of the vehicle-mounted radar or improves a false alarm (Ghost) probability of the vehicle-mounted radar, which poses non-negligible impact on driving safety and comfort of a vehicle. On this premise, how to reduce interference between the vehicle-mounted radars is a technical problem that needs to be resolved urgently.

SUMMARY

Embodiments of this application provide a signal sending method and a related apparatus, which may be applied to a sensor, especially in the radar field, and in particular, relate to a cooperative radar. The radar uses the method to perform cooperation through communication, to reduce mutual interference between radars, send a first signal, and further send a second signal used to indicate information about a resource occupied by the first signal, so that a second detection apparatus can select information about resources that do not interfere with each other to send the first signal. This reduces interference between different detection apparatuses during target detection, and improves performance during target detection.

According to a first aspect, an embodiment of this application provides a signal sending method, applied to a first detection apparatus. The method includes:

sending a first signal, where the first signal is used for target detection; and sending a second signal, where the second signal is used to indicate information about a resource occupied by the first signal.

In this embodiment of this application, the first detection apparatus sends the first signal used for target detection, and the first detection apparatus sends the second signal used to indicate the information about the resource occupied by the first signal. Therefore, another detection apparatus may be informed of the information about the resource occupied by the first signal sent by the detection apparatus, so that a second detection apparatus can determine, based on the information about the resource occupied by the first signal, information about a resource occupied by the first signal of the second detection apparatus, to reduce mutual interference between detection apparatuses during target detection. The detection apparatuses implement cooperation between a plurality of detection apparatuses through communication by using the foregoing method, to avoid or mitigate mutual interference.

With reference to the first aspect, in a possible embodiment, the information about the resource occupied by the first signal includes but is not limited to one or more of information about a time domain resource occupied by the first signal, information about a frequency domain resource occupied by the first signal, waveform type information of the first signal, and waveform parameter information of the first signal.

With reference to the first aspect, in a possible embodiment, the information about the resource occupied by the first signal is K consecutive sub-bands in N non-overlapping sub-bands, the N non-overlapping sub-bands belong to a first frequency band, and a frequency domain range of the first frequency band is predefined or pre-specified, where N and K are positive integers.

The information that is about the resource occupied by the first signal and that is indicated by the second signal may be specifically: indicating at least one of the K consecutive sub-bands.

In this example, the frequency domain resource is divided into non-overlapping sub-bands, so that resource usage fragmentation can be effectively reduced, and the second signal can indicate the frequency domain resource of the first signal in a relatively simple manner.

With reference to the first aspect, in a possible embodiment, when the second signal is sent, at least one second signal may be sent on at least one of the K consecutive sub-bands.

With reference to the first aspect, in a possible embodiment, the at least one second signal is sent on each of the K consecutive sub-bands.

In this example, the at least one second signal is sent on each sub-band, so that another detection apparatus can receive the second signal on any one of the K consecutive sub-bands. Therefore, the another detection apparatus can receive the second signal more easily, and a probability of receiving the second signal by the another detection apparatus can also be improved, to improve reliability of resource selection when the another detection apparatus sends the first signal.

With reference to the first aspect, in a possible embodiment, a start moment of the second signal is determined by using a sub-band on which the second signal is sent.

In this example, the sub-band of the second signal determines the start moment of the second signal, so that it can be easily implemented that time periods in which the detection apparatus transmits the second signal on different sub-bands do not overlap. This can reduce complexity during sending of the second signal. In this case, another detection apparatus may receive, in different time periods, the second signal transmitted on the different sub-bands. This can also reduce complexity during receiving of the second signal.

With reference to the first aspect, in a possible embodiment, the second signal indicates, by using a time domain resource and/or a frequency domain resource for transmitting the second signal, the information about the resource occupied by the first signal, and/or the second signal indicates, by using indication information in the second signal, the information about the resource occupied by the first signal.

In this example, the information about the resource occupied by the first signal is indicated by using the time domain resource and/or the frequency domain resource. In this way, an amount of information included in the indication information in the second signal can be reduced, to improve reliability when the information about the resource occupied by the first signal is obtained by using the second signal. Alternatively, the information about the resource occupied by the first signal may be indicated by using the indication information carried in the second signal.

With reference to the first aspect, in a possible embodiment, the indication information includes at least one of information about a time domain resource and/or a frequency domain resource occupied by the first signal and information about a time domain resource and/or a frequency domain resource not occupied by the first signal.

With reference to the first aspect, in a possible embodiment, a bandwidth of the second signal is less than or equal to a bandwidth of a sub-band on which the second signal is sent.

With reference to the first aspect, in a possible embodiment, a waveform type of the first signal and a waveform type of the second signal are the same.

In this example, the waveform type of the first signal and the waveform type of the second signal are the same, so that the detection apparatus may have a capability of receiving and sending the second signal through relatively simple improvement.

With reference to the first aspect, in a possible embodiment, a waveform type of the second signal includes a chirp pulse train, and the indication information includes a phase of at least one pulse of the chirp pulse train.

With reference to the first aspect, in a possible embodiment, the indication information includes at least one of the following: start moment information, sending periodicity information, and frequency resource information of the second signal.

With reference to the first aspect, in a possible embodiment, the indication information includes waveform type information and/or waveform-related parameter information of the first signal.

With reference to the first aspect, in a possible embodiment, values of the first M sampling points of the second signal are the same as values of the last M sampling points of the second signal, where M is a positive integer.

In this example, the second detection apparatus may obtain, by using relatively low precision of time synchronization, the information that is about the resource occupied by the first signal and that is indicated by the second signal.

According to a second aspect, an embodiment of this application provides a signal sending method. The method includes:

receiving a second signal sent by a first detection apparatus; and sending a third signal, where information about a resource occupied by the third signal is determined based on the second signal, and the third signal is used for target detection.

In this embodiment of this application, after receiving the second signal, the second detection apparatus determines the third signal based on the second signal. The third signal is used for target detection. Therefore, the second detection apparatus determines a sending resource of the third signal based on the second signal sent by the first detection apparatus. This can avoid that the information about the resource occupied by the third signal overlaps resource information indicated by the second signal, thereby reducing interference between different detection apparatuses that is caused by sending of the first signal.

With reference to the second aspect, in a possible embodiment, the information about the resource occupied by the first signal is K consecutive sub-bands in N non-overlapping sub-bands, the N non-overlapping sub-bands belong to a first frequency band, and a frequency domain range of the first frequency band is predefined or pre-specified, where N and K are positive integers, and the first signal is a signal that is sent by the first detection apparatus and used for target detection.

The second signal is used to indicate at least one of the K consecutive sub-bands.

With reference to the second aspect, in a possible embodiment, when sending the second signal, the first detection apparatus sends at least one second signal on at least one of the K consecutive sub-bands.

With reference to the second aspect, in a possible embodiment, when sending the second signal, the first detection apparatus sends the at least one second signal on each of the K consecutive sub-bands.

With reference to the second aspect, in a possible embodiment, when sending the second signal, the first detection apparatus determines a start moment of the second signal by using a sub-band on which the second signal is sent.

With reference to the second aspect, in a possible embodiment, a bandwidth of the second signal is less than or equal to a bandwidth of the sub-band on which the second signal is sent.

With reference to the second aspect, in a possible embodiment, a waveform type of the first signal and a waveform type of the second signal are the same.

With reference to the second aspect, in a possible embodiment, a waveform type of the second signal includes a chirp pulse train, and the indication information includes a phase of at least one pulse of the chirp pulse train.

With reference to the second aspect, in a possible embodiment, the indication information includes at least one of the following: start moment information, sending periodicity information, and frequency resource information of the second signal.

With reference to the second aspect, in a possible embodiment, values of the first M sampling points of the second signal are the same as values of the last M sampling points of the second signal, where M is a positive integer.

In this example, the second detection apparatus may obtain, by using relatively low precision of time synchronization, the information that is about the resource occupied by the first signal and that is indicated by the second signal.

With reference to the second aspect, in a possible embodiment, the information about the resource occupied by the third signal is determined based on information about a time domain resource and/or a frequency domain resource of at least one second signal.

In addition/Alternatively, the information about the resource occupied by the third signal is determined based on indication information in the at least one second signal.

With reference to the second aspect, in a possible embodiment, the indication information includes at least one of information about a time domain resource and/or a frequency domain resource occupied by the first signal and information about a time domain resource and/or a frequency domain resource not occupied by the first signal.

In this example, the indication information includes at least one of information about a time domain resource and/or a frequency domain resource occupied by the first signal and information about a time domain resource and/or a frequency domain resource not occupied by the first signal. This can reduce implementation complexity.

According to a third aspect, an embodiment of this application provides a detection apparatus. The apparatus includes:
  a first sending module, configured to send a first signal, where the first signal is used for target detection; and
  a second sending module, configured to send a second signal, where the second signal is used to indicate information about a resource occupied by the first signal.

With reference to the third aspect, in a possible embodiment, the information about the resource occupied by the first signal is K consecutive sub-bands in N non-overlapping sub-bands, the N non-overlapping sub-bands belong to a first frequency band, and a frequency domain range of the first frequency band is predefined or pre-specified, where N and K are positive integers.

The second signal is used to indicate at least one of the K consecutive sub-bands.

With reference to the third aspect, in a possible embodiment, the second sending module is configured to send at least one second signal on at least one of the K consecutive sub-bands.

With reference to the third aspect, in a possible embodiment, the second sending module is configured to send the at least one second signal on each of the K consecutive sub-bands.

With reference to the third aspect, in a possible embodiment, the detection apparatus further includes a processing module. The processing module is configured to determine a start moment of the second signal by using a sub-band on which the second signal is sent.

With reference to the third aspect, in a possible embodiment, the second signal indicates, by using a time domain resource and/or a frequency domain resource for transmitting the second signal, the information about the resource occupied by the first signal, and/or the second signal indicates, by using indication information in the second signal, the information about the resource occupied by the first signal.

With reference to the third aspect, in a possible embodiment, the indication information includes at least one of information about a time domain resource and/or a frequency domain resource occupied by the first signal and information about a time domain resource and/or a frequency domain resource not occupied by the first signal.

With reference to the third aspect, in a possible embodiment, a bandwidth of the second signal is less than or equal to a bandwidth of the sub-band on which the second signal is sent.

With reference to the third aspect, in a possible embodiment, a waveform type of the first signal and a waveform type of the second signal are the same.

With reference to the third aspect, in a possible embodiment, a waveform type of the second signal includes a chirp pulse train, and the indication information includes a phase of at least one pulse of the chirp pulse train.

With reference to the third aspect, in a possible embodiment, the indication information includes at least one of the following: start moment information, sending periodicity information, and frequency resource information of the second signal.

With reference to the third aspect, in a possible embodiment, values of the first M sampling points of the second signal are the same as values of the last M sampling points of the second signal, where M is a positive integer.

According to a fourth aspect, an embodiment of this application provides a detection apparatus. The apparatus includes:
  a receiving module, configured to receive a second signal sent by at least one first detection apparatus; and
  a sending module, configured to send a third signal, where information about a resource occupied by the third signal is determined based on the second signal, and the third signal is used for target detection.

With reference to the fourth aspect, in a possible embodiment, the information about the resource occupied by the first signal is K consecutive sub-bands in N non-overlapping sub-bands, the N non-overlapping sub-bands belong to a first frequency band, and a frequency domain range of the first frequency band is predefined or pre-specified, where N and K are positive integers, and the first signal is a signal that is sent by the first detection apparatus and used for target detection.

The second signal is used to indicate at least one of the K consecutive sub-bands.

With reference to the fourth aspect, in a possible embodiment, when sending the second signal, the first detection apparatus sends at least one second signal on at least one of the K consecutive sub-bands.

With reference to the fourth aspect, in a possible embodiment, when sending the second signal, the first detection apparatus sends the at least one second signal on each of the K consecutive sub-bands.

With reference to the fourth aspect, in a possible embodiment, when sending the second signal, the first detection apparatus determines a start moment of the second signal by using a sub-band on which the second signal is sent.

With reference to the fourth aspect, in a possible embodiment, a bandwidth of the second signal is less than or equal to a bandwidth of the sub-band on which the second signal is sent.

With reference to the fourth aspect, in a possible embodiment, a waveform type of the first signal and a waveform type of the second signal are the same.

With reference to the fourth aspect, in a possible embodiment, a waveform type of the second signal includes a chirp pulse train, and the indication information includes a phase of at least one pulse of the chirp pulse train.

With reference to the fourth aspect, in a possible embodiment, the indication information includes at least one of the following: start moment information, sending periodicity information, and frequency resource information of the second signal.

With reference to the fourth aspect, in a possible embodiment, values of the first M sampling points of the second signal are the same as values of the last M sampling points of the second signal, where M is a positive integer.

With reference to the fourth aspect, in a possible embodiment, the second detection apparatus determines, based on information about a time domain resource and/or a frequency domain resource of at least one second signal, the information about the resource occupied by the third signal.

In addition/Alternatively, the second detection apparatus determines, based on indication information in the at least one second signal, the information about the resource occupied by the third signal.

With reference to the fourth aspect, in a possible embodiment, the indication information includes at least one of information about a time domain resource and/or a frequency domain resource occupied by the first signal and information about a time domain resource and/or a frequency domain resource not occupied by the first signal.

According to a fifth aspect, an embodiment of this application provides a chip system. The chip system includes a processor, configured to support a detection apparatus in implementing the method according to any one of the implementations of the first aspect.

According to a sixth aspect, an embodiment of this application provides a chip system. The chip system includes a processor, configured to support a detection apparatus in implementing the method according to any one of the implementations of the second aspect.

According to a seventh aspect, an embodiment of this application provides a computer-readable storage medium. The computer-readable storage medium stores a computer program, the computer program includes program instructions, and when the program instructions are executed by a processor, the processor is enabled to perform the method according to any one of the implementations of the first aspect and the second aspect.

These aspects or other aspects of this application are clearer and more comprehensible in descriptions of the following embodiments.

BRIEF DESCRIPTION OF DRAWINGS

To describe the technical solutions in embodiments of this application or in the conventional technology more clearly, the following briefly describes the accompanying drawings for describing embodiments or the conventional technology. It is clear that the accompanying drawings in the following description show some embodiments of this application, and a person of ordinary skill in the art may still derive other drawings from these accompanying drawings without creative efforts.

DESCRIPTION OF EMBODIMENTS

The following describes embodiments of this application with reference to accompanying drawings.

First, target detection performed by a radar is described. A radar (Radar) in embodiments of this application is also referred to as a radar apparatus, or may be referred to as a detector or a detection apparatus. A working principle of the radar is that the radar sends a signal (or referred to as a detection signal) and receives a reflected signal reflected by a target object to detect a corresponding target object. A radar 1 and a radar 2 in embodiments of this application are merely used to distinguish between radars, and are not limited to specific radars. The radar 1 and the radar 2 may be cooperative radars or the like.

Figure 1:
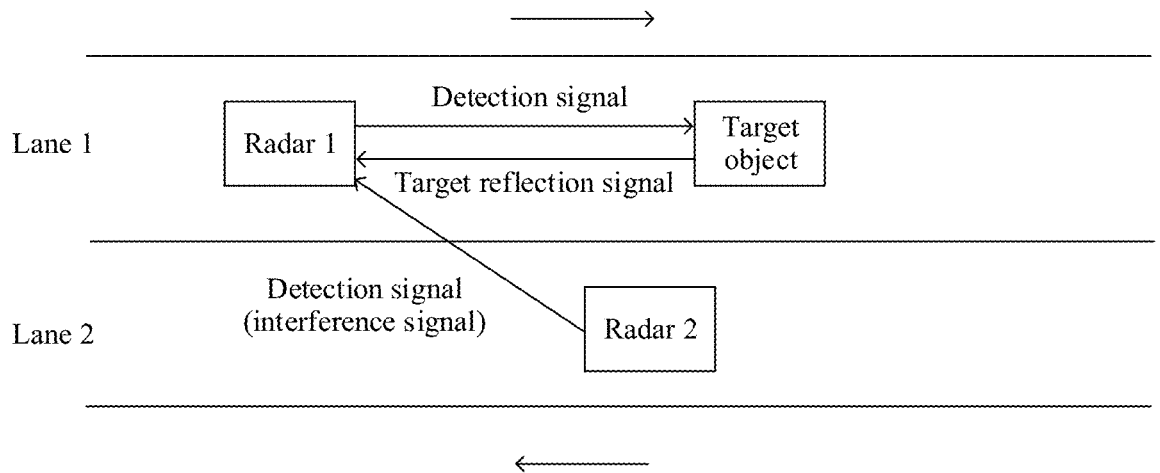
FIG. 1 is a schematic diagram of sending and receiving a detection signal by using a radar according to an embodiment of this application.

As shown in FIG. 1, an example in which the radar is a vehicle-mounted radar is used for description. A vehicle on which the radar 1 is located runs on a lane 1, and a vehicle on which the radar 2 is located runs on a lane 2. The lane 1 and the lane 2 are lanes close to each other. The lanes close to each other may be understood as other lanes on a same road, and may be adjacent lanes or may be non-adjacent lanes. The radar 1 sends a detection signal by using a resource that is constant in frequency domain and periodic in time domain. After the detection signal is reflected by a target object, the radar 1 receives the reflected detection signal (a target reflection signal). The radar 1 completes target detection based on at least one of the following parameters: signal strength of the target reflection signal, a signal transmission delay, a Doppler frequency of the signal, and a direction in which a wave vector is received, and based on at least one of: existence of the target object, RCS, a distance, a speed (accurately, a projection component of a relative speed (vector) on a connection line between the radar 1 and the target object), and an angle relative to the radar 1, and the like that are determined based on the foregoing parameters.

Because the radar 1 also receives a detection signal (an interference signal) sent by the radar 2, when information about a resource occupied by the detection signal sent by the radar 2 partially or completely overlaps information about a resource occupied by the detection signal sent by the radar 1, a signal for target detection (detection of existence, a distance, a speed, an angle, and the like of the target) received by the radar 1 may include both the target reflection signal and the detection signal (the interference signal) that is sent by the radar 2. In this case, the detection signal sent by the radar 2 causes interference to the radar 1, and affects detection of the target object by the radar 1. Possible impact includes: increasing noise floor during target detection performed by the radar 1, which decreases a capability of the radar 1 to detect a weak target and decreases target detection accuracy; forming a pseudo target; and the like. Therefore, how to reduce mutual interference between radars is a problem that needs to be resolved.

Embodiments of this application are intended to resolve a problem that mutual interference is caused between the radars during target detection. The radar 1 sends a detection signal, and further sends a sense dedicated signal. The sense dedicated signal indicates information about a resource occupied by the detection signal. The radar 2 senses the sense dedicated signal. After receiving the sense dedicated signal, the radar 2 determines, based on information about the occupied resource indicated by the sense dedicated signal, the information about the resource occupied by the detection signal sent by the radar 2. This can reduce mutual interference between the radars that is caused when the radars send the detection signal, and can improve accuracy during target detection performed by the radars.

Embodiments of this application provide a signal sending method and a related device, which may be applied to a sensor, especially in the radar field, and in particular, relate to a cooperative radar. The method is used by the radar to perform cooperation through communication, to reduce mutual interference between radars, and improve accuracy during target detection performed by the radar.

Figure 2:
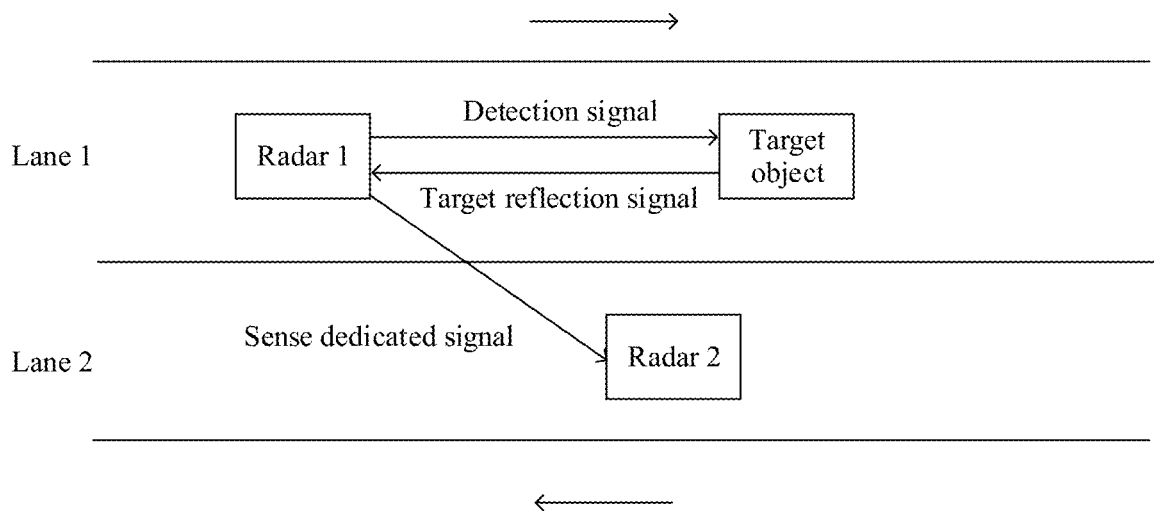
FIG. 2 is a schematic diagram of sending a detection signal and a sense dedicated signal by a radar according to an embodiment of this application.

As shown in FIG. 2, the radar 1 sends a detection signal and a sense dedicated signal. The sense dedicated signal is irrelevant to a brand, a model, or the like of the radar. The radar that sends the sense dedicated signal sends a sense signal according to a same rule. The sense dedicated signal indicates information about a resource occupied by the detection signal sent by the radar 1.

In a possible implementation, when the sense dedicated signal indicates the information about the resource occupied by the detection signal, the sense dedicated signal may indicate, by using a time domain resource and/or a frequency domain resource of the sense dedicated signal, the information about the resource occupied by the detection signal. In this way, an amount of information included in indication information in the sense dedicated signal can be reduced, so that reliability when the information about the resource occupied by the detection signal is obtained by using the sense dedicated signal is improved. Alternatively, the sense dedicated signal may indicate, by using the indication information in the sense dedicated signal, the information about the resource occupied by the detection signal. The indication information includes at least one of information about a frequency domain resource and/or a time domain resource occupied by the detection signal and information about a frequency domain resource and/or a time domain resource not occupied by the detection signal. The indication information may further include at least one of the following: start moment information, sending periodicity information, frequency resource information, and the like of a second signal. Certainly, the sense dedicated signal may further indicate resource information not occupied by the detection signal, which is specifically the same as the resource information occupied by the detection signal. Details are not described herein again.

In a possible implementation, the information about the resource occupied by the detection signal includes time domain resource information, frequency domain resource information, a waveform type of the detection signal, a waveform parameter of the detection signal, and the like. In a possible implementation, the information about the frequency domain resource occupied by the detection signal may be defined in the following manner: A frequency domain range of a first frequency band is a frequency domain resource that is available for the radar. The frequency domain resource may also be referred to as a system bandwidth. The first frequency band may be divided into at least N non-overlapping sub-bands. For example, the system bandwidth of the radar is from 77 GHz to 79 GHz, totally 2 GHz. The 2 GHz frequency band may be divided into a plurality of non-overlapping sub-bands. For example, the 2 GHz frequency band may be divided into 20 non-overlapping sub-bands, and a bandwidth of each sub-band is 100 MHz. The foregoing 20 sub-bands are all resource information that can be used by the radar. When the radar sends the detection signal by using the sub-bands, the radar may send the detection signal by using K consecutive sub-bands in the sub-bands. For example, the radar may send the detection signal by using three consecutive sub-bands, or may send the detection signal by using six consecutive sub-bands.

In a possible implementation, the time domain resource information of the detection signal may be, for example, a periodicity, a duty cycle, or a start moment.

In a possible implementation, information about the waveform type of the detection signal may be, for example, an FMCW waveform, a PMCW waveform, or a step frequency waveform, and information about the waveform parameter may be, for example, a pulse repetition periodicity or a pulse width. The sense dedicated signal may indicate at least one of the K consecutive sub-bands. The frequency domain resource is divided into non-overlapping sub-bands, so that resource usage fragmentation can be effectively reduced, and the sense dedicated signal can indicate the frequency domain resource of the detection signal in a relatively simple manner.

Figure 3:
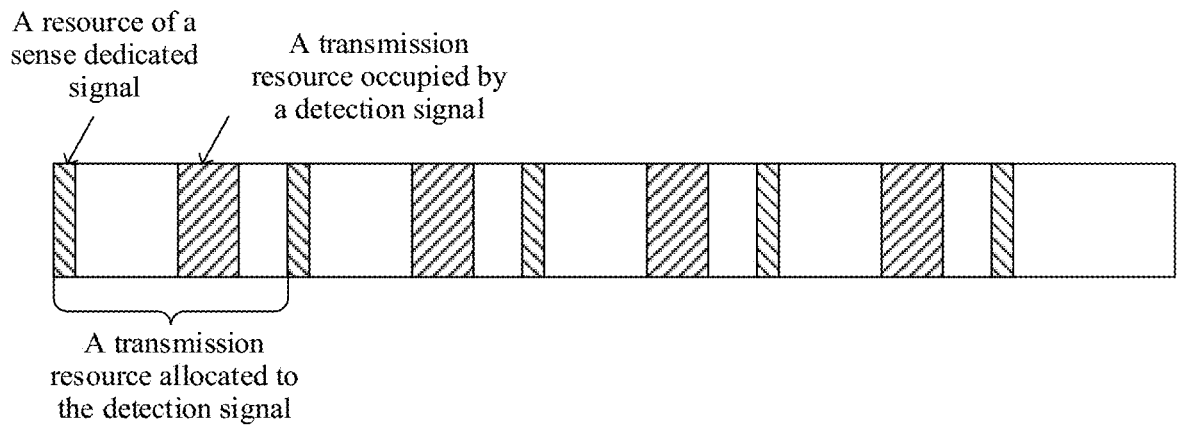
FIG. 3 is a schematic diagram of sending a detection signal and a sense dedicated signal by a radar according to an embodiment of this application.

In a possible implementation, FIG. 3 is a schematic diagram of sending a detection signal and a sense dedicated signal by the radar 1, and FIG. 3 shows different time domain resources occupied by the detection signal and the sense dedicated signal. Herein, a frequency domain resource occupied by the detection signal and a frequency domain resource occupied by the sense dedicated signal may be the same or may be different.

In a possible implementation, the radar 1 sends at least one sense dedicated signal on at least one of K consecutive sub-bands on which the detection signal is transmitted. In a specific example, the at least one sense dedicated signal is sent on each of the K consecutive sub-bands. For another example, the at least one sense dedicated signal is sent on some of the K consecutive sub-bands. For example, a bandwidth of the sense dedicated signal is less than or equal to a bandwidth of a sub-band on which the sense dedicated signal is sent. According to the foregoing method for transmitting the sense dedicated signal, when a detection bandwidth of the radar 2 covers only a bandwidth partially occupied by the radar 1, the radar 2 can still detect the sense dedicated signal sent by the radar 1, to learn of a resource occupied when the radar 1 transmits the detection signal. In a specific example, herein, an example in which the resource occupied by the detection signal is indicated by using a time domain resource of the sense dedicated signal is used for description. The radar 2 can detect only frequency bands from 77.2 GHz to 77.6 GHz, totally 400 MHz due to its own limited capability (limited by a transmitting capability of the radar and a target detection requirement, an actual and optional frequency band of the radar is usually a subset of detectable frequency bands). The radar 1 transmits the detection signal on a total of two consecutive 100 MHz sub-bands from 77.5 GHz to 77.7 GHz. If transmitting the sense dedicated signal on a total of two consecutive 100 MHz sub-bands from 77.5 GHz to 77.7 GHz, the radar 2 may sense the sense dedicated signal sent by the radar 1, to learn that the detection signal sent by the radar 1 occupies at least one 100 MHz bandwidth channel in total from 77.5 GHz to 77.6 GHz.

In a possible implementation, a frequency domain resource used by the radar 1 and the radar 2 to send the sense dedicated signal on each sub-band has a same location relative to a frequency domain resource on a corresponding sub-band. For example, on a 77.1 GHz to 77.2 GHz sub-band, the sense dedicated signal is sent by using 77.15 GHz to 77.16 GHz, and on a 77.2 GHz to 77.3 GHz sub-band, the sense dedicated signal is sent by using 77.25 GHz to 7.26 GHz. In this case, the frequency domain resource used to send the sense dedicated signal on these two sub-bands has a same location relative to the corresponding sub-band. For example, the following parameters of the sense dedicated signal sent by the radar 1 and the radar 2 may also be set to a same parameter: a PRT, a pulse width, and a frequency sweep slope.

Figure 4:
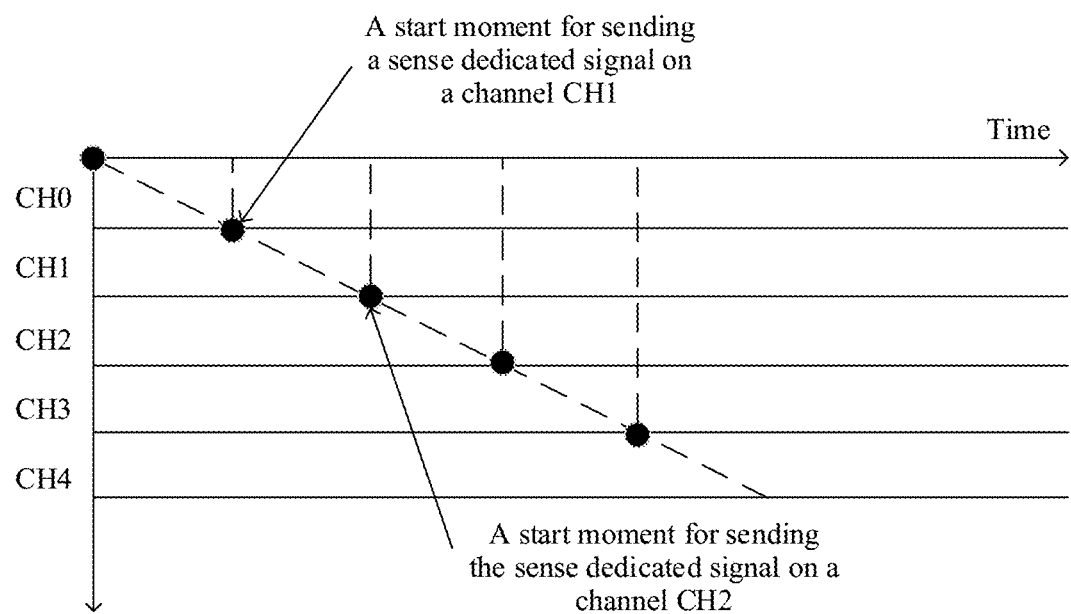
FIG. 4 is a schematic diagram of a start moment of a sense dedicated signal according to an embodiment of this application.

In a possible implementation, a start moment of the sense dedicated signal may be determined by using a sub-band on which the sense dedicated signal is sent, which may be specifically as follows: When different sub-bands are used to send the sense dedicated signal, the start moment of the sense dedicated signal corresponds to the sub-band, and different sub-bands correspond to different start moments. In a specific embodiment, as shown in FIG. 4, five sub-bands are used as an example for description herein. A start moment for sending a sense dedicated signal on a sub-band CH1 is different from a start moment for sending a sense dedicated signal on a sub-band CH2. FIG. 4 is merely an example for description. When the start moments are actually set, the start moments may not be in a linear relationship, and may be set randomly, which meets that one start moment corresponding to each sub-band is different from another start moment, so that the sense dedicated signals sent on each sub-band do not overlap in time. This reduces complexity during sending of the sense dedicated signal, and reduces complexity during detecting of the sense dedicated signal by the radar 2. In a possible implementation, when an interval between the sub-bands is relatively large, different sub-bands may correspond to a same start moment of the sense dedicated signal, or may correspond to different start moments of the sense dedicated signal. The relatively large interval between the sub-bands may be understood as that a frequency of the interval between the sub-bands is higher than a preset frequency.

In a possible implementation, the waveform type of the sense dedicated signal is the same as the waveform type of the detection signal. For example, the waveform of the detection signal is a chirp pulse train (also referred to as a frequency-modulated continuous wave FMCW), and the waveform of the sense dedicated signal is also a chirp pulse train. Certainly, there may be another waveform. This is not specifically limited herein. The waveform of the sense dedicated signal is the same as the waveform of the signal, which can simplify the complexity of sending the sense dedicated signal and the detection signal by the radar, and facilitates implement of the radar.

In a possible implementation, if the waveform type of the sense dedicated signal is the chirp pulse train, the bandwidth of the sense dedicated signal may also be less than a bandwidth of an intermediate frequency filter of the radar 1, to ensure that a received signal and a local signal are not filtered out by the intermediate frequency filter of the radar 1 after frequency mixing when a chirp start moment of the received signal and a chirp start moment of the local signal are in any relationship.

In a possible implementation, if the waveform of the sense dedicated signal is the chirp pulse train, the indication information includes an initial phase of at least one pulse of the chirp pulse train.

Figure 5:
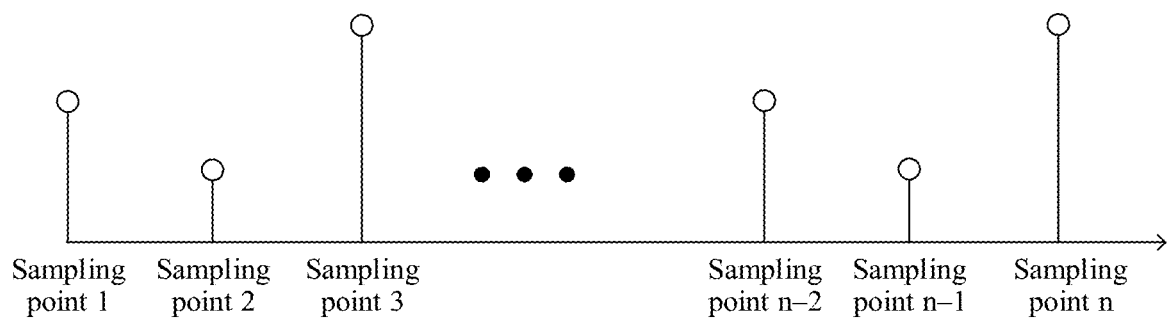
FIG. 5 is a schematic diagram of a sense dedicated signal according to an embodiment of this application.

In a possible implementation, values of the first M sampling points of the sense dedicated signal are the same as values of the last M sampling points of the sense dedicated signal. As shown in FIG. 5, an example in which for the sampling points, M=3 is used for description herein. A value of a sampling point 1 is the same as a value of a sampling point n−2, a value of a sampling point 2 is the same as a value of a sampling point n−1, and a value of a sampling point 3 is the same as a value of a sampling point n. The radar 1 and the radar 2 may obtain, by using relatively low precision of time synchronization, a resource that is occupied by the detection signal and indicated by the sense dedicated signal.

Figure 6:
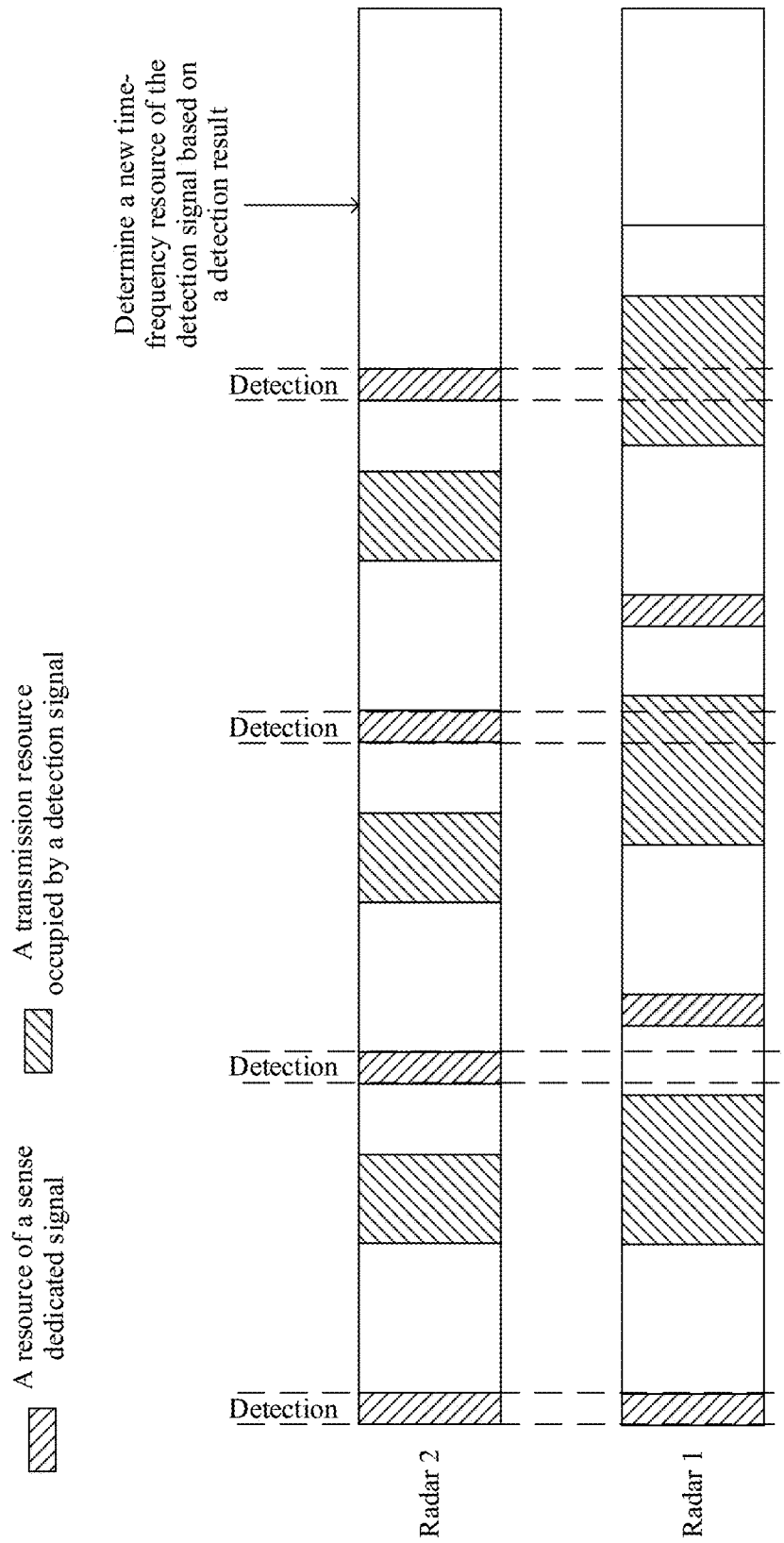
FIG. 6 is a schematic diagram of detecting a sense dedicated signal by a radar according to an embodiment of this application.

In a possible implementation, the radar 2 detects the sense dedicated signal sent by the radar 1. After detecting the sense dedicated signal, the radar 2 determines, based on resource information indicated by the sense dedicated signal, a sending resource used by the radar 2 to send the detection signal. Herein, the radar 1 may be a single radar that sends the sense dedicated signal, or may be a plurality of radars that send the sense dedicated signal. Therefore, when determining, based on the sense dedicated signal, a resource occupied by the detection signal sent by the radar 2, the radar 2 may determine the resource occupied by the detection signal by using the sense dedicated signal sent by the single radar, or may determine the resource occupied by the detection signal by using sense dedicated signals sent by the plurality of radars that send the sense dedicated signals. As shown in FIG. 6, an example in which a sense dedicated signal sent by the radar 1 is received is used for description. After detecting the sense dedicated signal sent by the radar 1, the radar 2 re-determines a resource occupied by a detection signal. When re-determining the resource occupied by the detection signal, the radar 2 may select a part or all of resource information other than the occupied resource indicated by the sense dedicated signal as the resource occupied by the detection signal sent by the radar 2. The radar 2 may send the sense dedicated signal, or may not send the sense dedicated signal. This is not specifically limited in this application.

Figure 7:
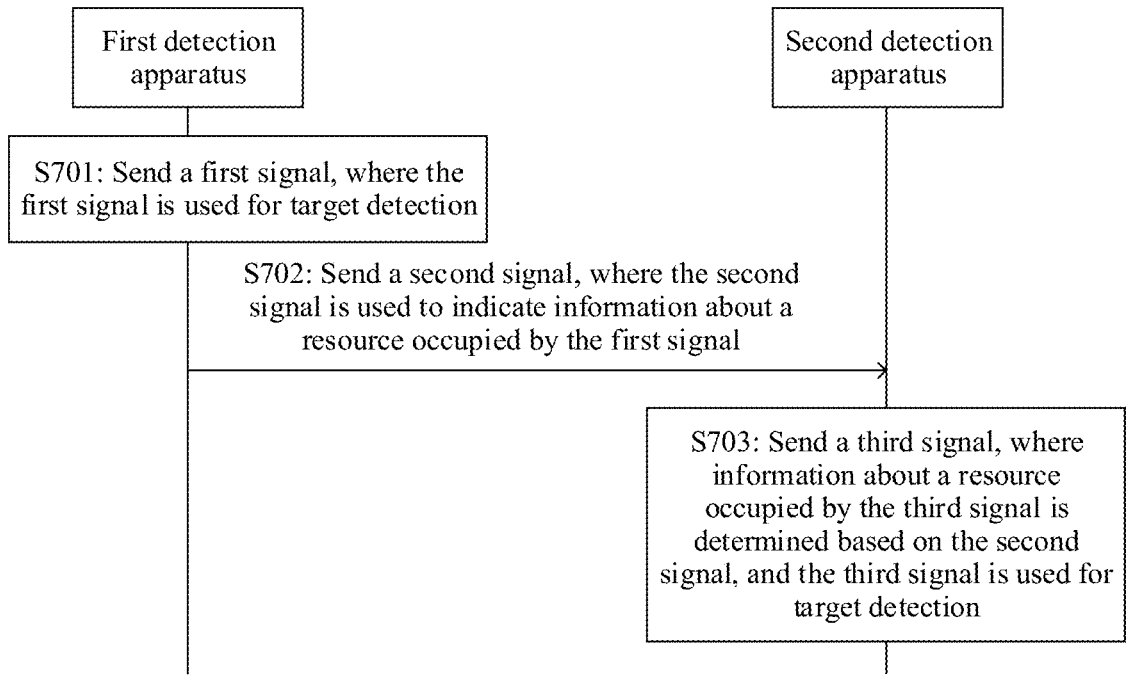
FIG. 7 is a schematic interaction diagram of a signal sending method according to an embodiment of this application.

FIG. 7 is a schematic interaction diagram of a signal sending method according to an embodiment of this application. As shown in FIG. 7, a first detection apparatus may be the radar 1 in the foregoing embodiments, a second detection apparatus may be the radar 2 in the foregoing embodiments, a first signal is the detection signal in the foregoing embodiments, and a second signal is the sense dedicated signal in the foregoing embodiments. The signal sending method includes the following steps:

S701: The first detection apparatus sends the first signal, where the first signal is used for target detection.

Optionally, the first detection apparatus sends the first signal by using a resource that is constant in frequency domain and periodic in time domain.

S702: The first detection apparatus sends the second signal, where the second signal is used to indicate information about a resource occupied by the first signal.

The second signal is irrelevant to a brand, a model, or the like of the first detection apparatus. The detection apparatus that sends the sense dedicated signal sends a sense signal according to a same rule. The information about the resource occupied by the first signal includes time domain resource information and/or frequency domain resource information.

Optionally, a waveform type of the second signal may be the same as a waveform type of the first signal.

S703: The second detection apparatus sends a third signal, where information about a resource occupied by the third signal is determined based on the second signal, and the third signal is used for target detection.

The second detection apparatus receives the second signal sent by the first detection apparatus. After receiving the second signal sent by the first detection apparatus, the second detection apparatus determines, based on the second signal, the information about the resource occupied by the third signal. The information about the resource occupied by the third signal includes time domain resource information and frequency domain resource information. The information about the resource occupied by the third signal may be a part or all of resource information other than the information about the occupied resource indicated by the second signal.

In a possible embodiment, the information about the resource occupied by the first signal is K consecutive sub-bands in N non-overlapping sub-bands, the N non-overlapping sub-bands belong to a first frequency band, and a frequency domain range of the first frequency band is predefined or pre-specified, where N and K are positive integers.

The second signal is used to indicate at least one of the K consecutive sub-bands.

In a possible embodiment, at least one second signal is sent on at least one of the K consecutive sub-bands.

In a possible embodiment, the at least one second signal is sent on each of the K consecutive sub-bands.

In a possible embodiment, a start moment of the second signal is determined by using a sub-band on which the second signal is sent.

In a possible embodiment, the second signal indicates, by using a time domain resource and/or a frequency domain resource for transmitting the second signal, the information about the resource occupied by the first signal, and/or the second signal indicates, by using indication information in the second signal, the information about the resource occupied by the first signal.

In a possible embodiment, the indication information includes at least one of information about a time domain resource and/or a frequency domain resource occupied by the first signal and information about a time domain resource and/or a frequency domain resource not occupied by the first signal.

In a possible embodiment, a bandwidth of the second signal is less than or equal to a bandwidth of the sub-band on which the second signal is sent.

In a possible embodiment, a waveform type of the first signal and a waveform type of the second signal are the same.

In a possible embodiment, a waveform type of the second signal includes a chirp pulse train, and the indication information includes a phase of at least one pulse of the chirp pulse train.

In a possible embodiment, the indication information includes at least one of the following: start moment information, sending periodicity information, and frequency resource information of the second signal.

In a possible embodiment, values of the first M sampling points of the second signal are the same as values of the last M sampling points of the second signal, where M is a positive integer.

For ease of description, that the first detection apparatus and the second detection apparatus perform target detection and the like is not described in detail in this embodiment. For details, refer to related descriptions in FIG. 1, FIG. 2, and the like. That the detection apparatus sends the first signal, the second signal, and the like is not described either in this embodiment. For details, refer to FIG. 3 and related descriptions. For other terms, definitions, signal reception, and the like, refer to content described in the foregoing embodiment.

Figure 8:
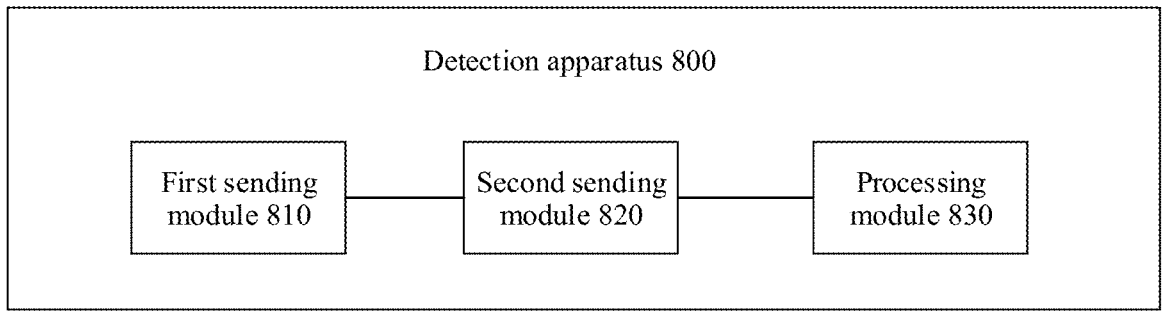
FIG. 8 is a schematic diagram of a structure of a detection apparatus according to an embodiment of this application.

FIG. 8 is a schematic diagram of a structure of a detection apparatus according to an embodiment of this application. A detection apparatus 800 provided in this embodiment of this application includes:

a first sending module 810, configured to send a first signal, where the first signal is used for target detection; and a second sending module 820, configured to send a second signal, where the second signal is used to indicate information about a resource occupied by the first signal.

In a possible embodiment, the information about the resource occupied by the first signal is K consecutive sub-bands in N non-overlapping sub-bands, the N non-overlapping sub-bands belong to a first frequency band, and a frequency domain range of the first frequency band is predefined or pre-specified, where N and K are positive integers.

The second signal is used to indicate at least one of the K consecutive sub-bands.

In a possible embodiment, the second sending module is configured to send at least one second signal on at least one of the K consecutive sub-bands.

In a possible embodiment, the second sending module is configured to send the at least one second signal on each of the K consecutive sub-bands.

In a possible embodiment, the detection apparatus further includes a processing module 830. The processing module is configured to determine a start moment of the second signal by using a sub-band on which the second signal is sent.

In a possible embodiment, the second signal indicates, by using a time domain resource and/or a frequency domain resource for transmitting the second signal, the information about the resource occupied by the first signal, and/or the second signal indicates, by using indication information in the second signal, the information about the resource occupied by the first signal.

In a possible embodiment, the indication information includes at least one of information about a time domain resource and/or a frequency domain resource occupied by the first signal and information about a time domain resource and/or a frequency domain resource not occupied by the first signal.

In a possible embodiment, a bandwidth of the second signal is less than or equal to a bandwidth of the sub-band on which the second signal is sent.

In a possible embodiment, a waveform type of the first signal and a waveform type of the second signal are the same.

In a possible embodiment, a waveform type of the second signal includes a chirp pulse train, and the indication information includes a phase of at least one pulse of the chirp pulse train.

In a possible embodiment, the indication information includes at least one of the following: start moment information, sending periodicity information, and frequency resource information of the second signal.

In a possible embodiment, values of the first M sampling points of the second signal are the same as values of the last M sampling points of the second signal, where M is a positive integer.

Figure 9:
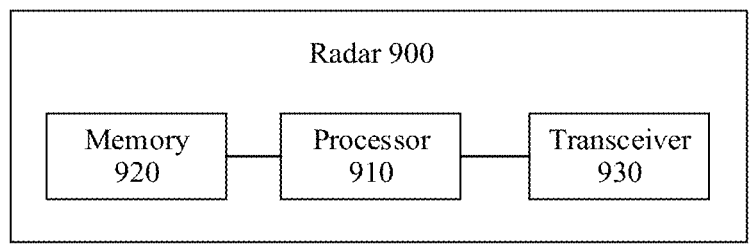
FIG. 9 is a schematic diagram of a structure of a radar according to an embodiment of this application.

As shown in FIG. 9, an embodiment of this application further provides a radar 900. The radar 900 includes a processor 910, a memory 920, and a transceiver 930. The memory 920 stores instructions or a program, and the processor 910 is configured to execute the instructions or the program stored in the memory 920. When the instruction or the program stored in the memory 920 is executed, the processor 910 is configured to perform an operation performed by the processing module 830 in the foregoing embodiment, and the transceiver 930 is configured to perform operations performed by the first sending module 810 and the second sending module 820 in the foregoing embodiment.

Figure 10:
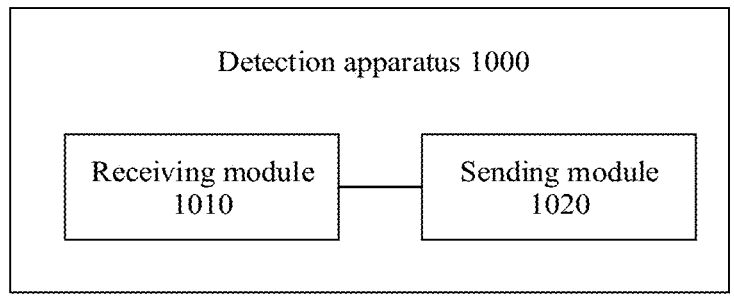
FIG. 10 is a schematic diagram of a structure of a detection apparatus according to an embodiment of this application.

FIG. 10 is a schematic diagram of a structure of a detection apparatus according to an embodiment of this application. A detection apparatus 1000 provided in this embodiment of this application includes:

a receiving module 1010, configured to receive a second signal sent by at least one first detection apparatus; and a sending module 1020, configured to send a third signal, where information about a resource occupied by the third signal is determined based on the second signal, and the third signal is used for target detection.

In a possible embodiment, when sending the second signal, the first detection apparatus sends at least one second signal on at least one of the K consecutive sub-bands.

With reference to the fourth aspect, in a possible embodiment, when sending the second signal, the first detection apparatus sends the at least one second signal on each of the K consecutive sub-bands.

In a possible embodiment, when sending the second signal, the first detection apparatus determines a start moment of the second signal by using a sub-band on which the second signal is sent.

In a possible embodiment, a bandwidth of the second signal is less than or equal to a bandwidth of the sub-band on which the second signal is sent.

In a possible embodiment, a waveform type of the first signal and a waveform type of the second signal are the same.

In a possible embodiment, a waveform type of the second signal includes a chirp pulse train, and the indication information includes a phase of at least one pulse of the chirp pulse train.

In a possible embodiment, the indication information includes at least one of the following: start moment information, sending periodicity information, and frequency resource information of the second signal.

In a possible embodiment, values of the first M sampling points of the second signal are the same as values of the last M sampling points of the second signal, where M is a positive integer.

In a possible embodiment, the information about the resource occupied by the third signal is determined based on information about a time domain resource and/or a frequency domain resource of at least one second signal.

In addition/Alternatively, the information about the resource occupied by the third signal is determined based on indication information in the at least one second signal.

In a possible embodiment, the indication information includes at least one of information about a time domain resource and/or a frequency domain resource occupied by the first signal and information about a time domain resource and/or a frequency domain resource not occupied by the first signal.

Figure 11:
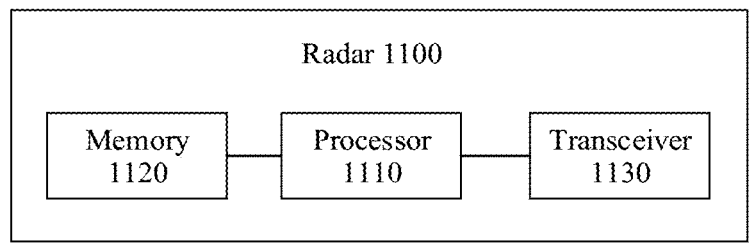
FIG. 11 is a schematic diagram of a structure of a radar according to an embodiment of this application.

As shown in FIG. 11, an embodiment of this application further provides a radar 1100. The radar 1100 includes a processor 1110, a memory 1120, and a transceiver 1130. The memory 1120 stores instructions or a program, and the processor 1110 is configured to execute the instructions or the program stored in the memory 1120. When the instruction or the program stored in the memory 1120 is executed, the transceiver 1130 is configured to perform operations performed by the receiving module 1010 and the sending module 1020 in the foregoing embodiment.

Figure 12:
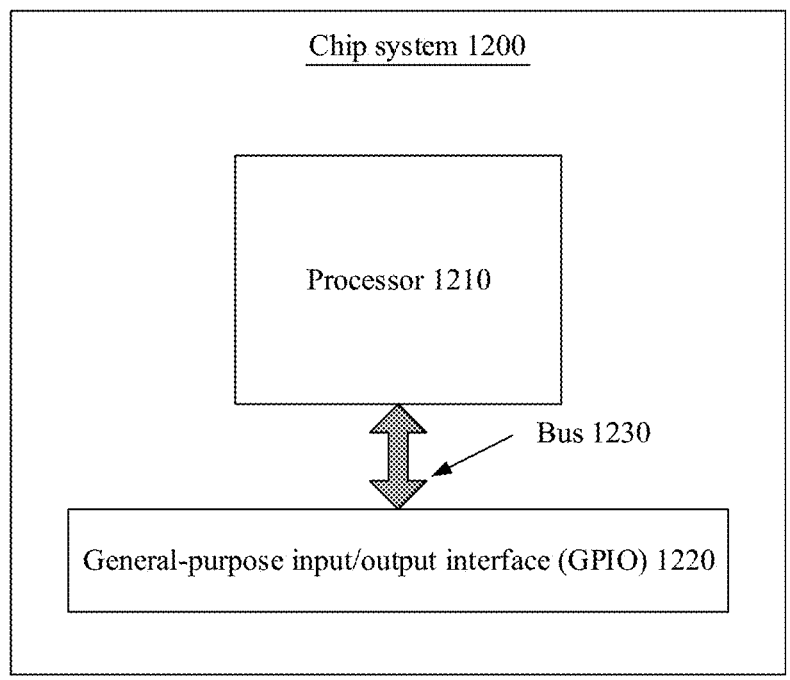
FIG. 12 is a schematic diagram of a structure of a chip system according to an embodiment of this application.

FIG. 12 is a schematic diagram of a structure of a chip system according to an embodiment of this application. As shown in FIG. 12, a chip system 1200 may include a processor 1210 and one or more interfaces 1220 coupled to the processor 1210. An example is as follows:

The processor 1210 may be configured to: read and execute computer-readable instructions. During specific implementation, the processor 1210 may mainly include a controller, an arithmetic unit, and a register. For example, the controller is mainly responsible for decoding instructions and sending a control signal for an operation corresponding to the instructions. The arithmetic unit is mainly responsible for performing a fixed-point or floating-point arithmetic operation, a shift operation, a logic operation, and the like, and may also perform an address operation and address translation. The register is mainly responsible for storing a quantity of register operations, intermediate operation results, and the like that are temporarily stored during instruction execution. During specific implementation, a hardware architecture of the processor 1210 may be an application-specific integrated circuit (application specific integrated circuit, ASIC) architecture, a microprocessor without interlocked piped stages (microprocessor without interlocked piped stages architecture, MIPS) architecture, an advanced reduced instruction set computer machines (advanced RISC machines, ARM) architecture, an NP architecture, or the like. The processor 1210 may be a single-core or multi-core processor.

For example, the interface 1220 may be configured to input to-be-processed data to the processor 1210, and may output a processing result of the processor 1210. During specific implementation, the interface 1220 may be a general-purpose input/output (general purpose input output, GPIO) interface. The interface 1220 is connected to the processor 1210 through a bus 1230.

In a possible implementation, the processor 1210 may be configured to: invoke, from a memory, a program or data for implementation on a detection apparatus side in the signal sending method provided in one or more embodiments of this application, so that the chip can implement the method shown in FIG. 3 to FIG. 7. The memory may be integrated into the processor 1210, or may be coupled to the communication chip 1200 through the interface 1220. In other words, the memory may be a part of the communication chip 1200, or may be independent of the communication chip 1200. The interface 1220 may be configured to output an execution result of the processor 1210. In this application, the interface 1220 may be specifically configured to output a decoding result of the processor 1210. For the signal sending method provided in one or more embodiments of this application, refer to the foregoing embodiments. Details are not described herein again.

It should be noted that a function corresponding to each of the processor 1210 and the interface 1220 may be implemented by using a hardware design, may be implemented by using a software design, or may be implemented by combining software and hardware. This is not limited herein.

It may be further understood that the memory mentioned in embodiments of this application may be a volatile memory or a nonvolatile memory, or may include both a volatile memory and a nonvolatile memory. The nonvolatile memory may be a read-only memory (Read-Only Memory, ROM), a programmable read-only memory (Programmable ROM, PROM), an erasable programmable read-only memory (Erasable PROM, EPROM), an electrically erasable programmable read-only memory (Electrically EPROM, EEPROM), or a flash memory. The volatile memory may be a random access memory (Random Access Memory, RAM), used as an external cache. Through example but not limitative description, many forms of RAMs may be used, for example, a static random access memory (Static RAM, SRAM), a dynamic random access memory (Dynamic RAM, DRAM), a synchronous dynamic random access memory (Synchronous DRAM, SDRAM), a double data rate synchronous dynamic random access memory (Double Data Rate SDRAM, DDR SDRAM), an enhanced synchronous dynamic random access memory (Enhanced SDRAM, ESDRAM), a synchlink dynamic random access memory (Synchlink DRAM, SLDRAM), and a direct rambus random access memory (Direct Rambus RAM, DR RAM).

It should be noted that when the processor is a general-purpose processor, a DSP, an ASIC, an FPGA, another programmable logic device, a transistor logic device, or a discrete hardware component, the memory (a storage module) is integrated into the processor.

An embodiment of this application further provides a computer-readable storage medium. The computer-readable storage medium may store a program. When the program is executed, some or all steps of any signal sending method recorded in the foregoing method embodiments are performed.

It should be noted that, for brief description, the foregoing method embodiments are each represented as a combination of a series of actions. However, a person skilled in the art should appreciate that this application is not limited to the described sequence of the actions, because according to this application, some steps may be performed in another sequence or simultaneously. It should be further appreciated by a person skilled in the art that embodiments described in this specification all belong to example embodiments, and the involved actions and modules are not necessarily required in this application.

In the foregoing embodiments, descriptions of embodiments have respective focuses. For a part that is not described in detail in an embodiment, refer to related descriptions in other embodiments.

In the several embodiments provided in this application, it should be understood that the disclosed apparatus may be implemented in other manners. For example, the foregoing apparatus embodiments are merely examples. For example, division into the units is merely logical function division. During actual implementation, there may be another division manner. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in an electrical form or another form.

The units described as separate parts may or may not be physically separate, and parts displayed as units may or may not be physical units, in other words, may be located in one position, or may be distributed on a plurality of network units. Some or all of the units may be selected based on actual requirements to achieve the objectives of the solutions in embodiments.

In addition, function units in embodiments of this application may be integrated into one processing unit, or each of the units may exist alone physically, or two or more units are integrated into one unit. The integrated unit may be implemented in a form of hardware, or may be implemented in a form of a software function unit.

When the integrated unit is implemented in the form of a software function unit and sold or used as an independent product, the integrated unit may be stored in a computer-readable memory. Based on such an understanding, the technical solutions of this application essentially, or the part contributing to the conventional technology, or all or some of the technical solutions may be implemented in the form of a software product. The computer software product is stored in a memory and includes several instructions for instructing a computer device (which may be a personal computer, a server, or a network device) to perform all or some of the steps of the methods in embodiments of this application. The foregoing memory includes any medium that can store program code, such as a USB flash drive, a read-only memory (ROM, Read-Only Memory), a random access memory (RAM, Random Access Memory), a removable hard disk, a magnetic disk, or an optical disc.

A person of ordinary skill in the art may understand that all or some of the steps of the methods in embodiments may be implemented by a program instructing related hardware. The program may be stored in a computer-readable memory. The memory may include a flash memory, a read-only memory (English: Read-Only Memory, ROM for short), a random access memory (English: Random Access Memory, RAM for short), a magnetic disk, an optical disc, or the like.

Embodiments of this application are described in detail above. The principle and implementation of this application are described herein through specific examples. The description about embodiments is merely provided to help understand the method and core ideas of this application. In addition, a person of ordinary skill in the art can make variations and modifications to this application in terms of the specific implementations and application scopes according to the ideas of this application. Therefore, the content of specification shall not be construed as a limit to this application.

What is claimed is:

1. A signal transmission method comprising:
sending, by a detection apparatus, a first signal for target detection; and
sending, by the detection apparatus, a second signal indicating information about a resource occupied by the first signal, wherein the resource occupied by the first signal is K consecutive sub-bands in N non-overlapping sub-bands, the N non-overlapping sub-bands belong to a first frequency band, a frequency domain range of the first frequency band is predetermined, and N and K are positive integers.

2. The method according to claim 1, wherein the second signal indicates at least one of the K consecutive sub-bands.

3. The method according to claim 2, wherein the second signal is sent on at least one of the K consecutive sub-bands.

4. The method according to claim 3, wherein the second signal is sent on each of the K consecutive sub-bands.

5. The method according to claim 3, wherein a starting time of sending the second signal is determined by using a sub-band on which the second signal is sent.

6. The method according to claim 1, wherein the second signal indicates, by using a time domain resource or a frequency domain resource for transmitting the second signal, the information about the resource occupied by the first signal.

7. The method according to claim 6, wherein the second signal indicates at least one of information about a time domain resource or a frequency domain resource occupied by the first signal, or information about a time domain resource or a frequency domain resource not occupied by the first signal.

8. The method according to claim 4, wherein a bandwidth of the second signal is less than or equal to a bandwidth of a sub-band on which the second signal is sent.

9. The method according to claim 1, wherein a waveform type of the first signal and a waveform type of the second signal are the same.

10. The method according to claim 6, wherein a waveform type of the second signal comprises a chirp pulse train, and the indication information comprises a phase of at least one pulse of the chirp pulse train.

11. The method according to claim 6, wherein the indication information comprises at least one of the following: start moment information, sending periodicity information, and frequency resource information of the second signal.

12. The method according to claim 1, wherein values of the first M sampling points of the second signal are the same as values of the last M sampling points of the second signal, wherein M is a positive integer.

13. A signal transmission method comprising:
receiving, by a second detection apparatus, a second signal sent by a first detection apparatus, wherein the second signal indicates information about a resource occupied by a first signal sent by the first detection apparatus, the resource occupied by the first signal is K consecutive sub-bands in N non-overlapping sub-bands, the N non-overlapping sub-bands belong to a first frequency band, a frequency domain range of the first frequency band is predetermined, and N and K are positive integers; and
sending, by the second detection apparatus, a third signal for target detection, wherein information about a resource occupied by the third signal is determined based on the second signal.

14. The method according to claim 13, wherein the method comprises:
determining, by the second detection apparatus based on information about a time domain resource or a frequency domain resource of at least one second signal, the information about the resource occupied by the third signal.

15. The method according to claim 14, wherein the second signal indicates at least one of: information about a time domain resource or a frequency domain resource occupied by the first signal, and information about a time domain resource or a frequency domain resource not occupied by the first signal.

16. An apparatus, comprising:
a memory storing instructions; and
at least one processor coupled to the memory for executing the instructions to cause the apparatus to:
send a first signal for target detection; and
send a second signal indicating information about a resource occupied by the first signal, wherein the resource occupied by the first signal is K consecutive sub-bands in N non-overlapping sub-bands, the N non-overlapping sub-bands belong to a first frequency band, a frequency domain range of the first frequency band is predetermined, and N and K are positive integers.

17. The apparatus according to claim 16, wherein the second signal indicates at least one of the K consecutive sub-bands.

18. The apparatus according to claim 17, wherein the second signal is sent on at least one of the K consecutive sub-bands.

19. The apparatus according to claim 18, wherein the second signal is sent on each of the K consecutive sub-bands.

20. The apparatus according to claim 18, wherein a starting time of sending the second signal is determined by using a sub-band on which the second signal is sent.

21. The apparatus according to claim 16, wherein the second signal indicates, by using a time domain resource or a frequency domain resource for transmitting the second signal, the information about the resource occupied by the first signal.

* * * * *